(12) United States Patent
Beane

(10) Patent No.: US 8,888,438 B2
(45) Date of Patent: Nov. 18, 2014

(54) MOMENT OF INERTIA SYSTEM FOR PRODUCING ENERGY THROUGH THE ACTION OF WIND

(71) Applicant: Glenn L. Beane, Hanover, NH (US)

(72) Inventor: Glenn L. Beane, Hanover, NH (US)

(*) Notice: Subject to any disclaimer, the term of this patent is extended or adjusted under 35 U.S.C. 154(b) by 0 days.

(21) Appl. No.: 14/044,410

(22) Filed: Oct. 2, 2013

(65) Prior Publication Data

US 2014/0035288 A1 Feb. 6, 2014

Related U.S. Application Data

(63) Continuation-in-part of application No. 12/575,195, filed on Oct. 7, 2009, now abandoned.

(60) Provisional application No. 61/195,513, filed on Oct. 8, 2008.

(51) Int. Cl.
*F03D 7/06* (2006.01)
*F03D 3/00* (2006.01)
*F03D 3/04* (2006.01)

(52) U.S. Cl.
CPC .............. *F03D 3/002* (2013.01); *F03D 3/0436* (2013.01); *Y02E 10/74* (2013.01); *F05B 2240/40* (2013.01)
USPC ............................................ 415/4.1; 290/55

(58) Field of Classification Search
USPC .......................................................... 415/4.1
See application file for complete search history.

(56) References Cited

U.S. PATENT DOCUMENTS

| | | | |
|---|---|---|---|
| 1,300,499 A | 4/1919 | Slagel | |
| 2,542,522 A | 2/1951 | Hings | |
| 3,883,261 A | 5/1975 | Saxmann | |
| 3,986,786 A * | 10/1976 | Sellman | 415/151 |
| 4,165,468 A | 8/1979 | Fry et al. | |
| 4,189,280 A * | 2/1980 | Dohm | 415/4.1 |
| 4,204,795 A | 5/1980 | Forrest | |
| 4,321,476 A | 3/1982 | Buels | |
| 4,471,612 A | 9/1984 | Buels | |
| 5,348,443 A | 9/1994 | Roberts | |
| 5,350,273 A | 9/1994 | Hector, Sr. et al. | |
| 5,472,311 A | 12/1995 | Davis | |
| 5,495,128 A | 2/1996 | Brammeier | |
| 6,160,336 A | 12/2000 | Baker, Jr. et al. | |
| 6,481,957 B1 * | 11/2002 | Brill | 415/4.1 |
| 6,655,907 B2 * | 12/2003 | Brock et al. | 415/4.2 |

(Continued)

FOREIGN PATENT DOCUMENTS

CN 201209518 Y 3/2009
FR 2841605 A1 1/2004

(Continued)

*Primary Examiner* — Joseph Waks
(74) *Attorney, Agent, or Firm* — Devine, Millimet & Branch; Paul C. Remus; Kimberly A. Peaslee

(57) ABSTRACT

A system and method of generating energy by transforming energy from a low-density substance, such as airflow or wind, into kinetic energy by directing the flow through a wind guide system towards panels that rotate in generally the same direction as the airflow. Furthermore, the system uses the ground and/or water as a surface for guiding the airflow towards the windmill devices. The system is made of lightweight, inexpensive tension compression construction. The tension compression system is weighted at the outermost ends of the wind-engaging panels to create a moment of inertia device capable of evening out the peaks typical of wind power generation.

2 Claims, 15 Drawing Sheets

(56) References Cited

U.S. PATENT DOCUMENTS

| | | |
|---|---|---|
| 7,315,093 B2 | 1/2008 | Graham, Sr. |
| 7,358,623 B2 * | 4/2008 | Richards et al. ............ 290/55 |
| 7,540,705 B2 | 6/2009 | Emshey |
| 7,592,711 B1 | 9/2009 | Lee |
| 7,994,652 B2 * | 8/2011 | Grabau et al. ............ 290/55 |
| 7,999,406 B2 | 8/2011 | Cardinal et al. |
| 8,257,020 B2 * | 9/2012 | Graham, Sr. ............ 415/4.3 |
| 2002/0015639 A1 * | 2/2002 | Roberts ............ 415/4.1 |
| 2006/0140748 A1 | 6/2006 | Raziel |
| 2006/0249720 A1 | 11/2006 | Kirby |
| 2007/0001460 A1 | 1/2007 | Killian |
| 2007/0018462 A1 | 1/2007 | Richards et al. |
| 2007/0222225 A1 | 9/2007 | Mahoney |
| 2009/0110554 A1 * | 4/2009 | Dukovic et al. ............ 416/41 |
| 2010/0295318 A1 | 11/2010 | Liao |
| 2011/0167687 A1 | 7/2011 | Winkler |
| 2011/0318161 A1 * | 12/2011 | Miljkovic ............ 415/1 |
| 2012/0211992 A1 * | 8/2012 | Boone ............ 290/55 |

FOREIGN PATENT DOCUMENTS

| | | |
|---|---|---|
| GB | 2264754 A | 9/1993 |
| GB | 2341646 A | 3/2000 |
| JP | 201193631 A | 7/2001 |
| JP | 2001193631 A | 7/2001 |
| JP | 2005066086 A | 3/2005 |
| JP | 2005207288 A | 8/2005 |
| WO | 9508062 A1 | 3/1995 |
| WO | 2005108779 A2 | 11/2005 |
| WO | 2008029967 A1 | 3/2008 |

* cited by examiner

MOMENT OF INERTIA SYSTEM FOR PRODUCING ENERGY THROUGH THE ACTION OF WIND

CROSS-REFERENCE TO RELATED APPLICATIONS

This application is a Continuation-in-part of U.S. patent application Ser. No. 12/575,195, filed Oct. 7, 2009, which claims the benefit of Provisional Patent Application No. 61/195,513 filed Oct. 8, 2008, which is incorporated herein by reference.

FIELD OF THE INVENTION

The present invention is a system and method for producing energy from the action of wind. More particularly, it is a system and method for creating a moment of inertia device for producing electricity through the action of wind with a weighted wind wheel.

BACKGROUND OF THE INVENTION

There are numerous approaches to producing electricity from the movement of air or wind. Conventional systems place a series of large blades, generally over 30 feet long, which rotate about a hub. The hub is positioned on a pole or tower and is located generally at least 80 feet above the ground or water. The blades generally rotate in a direction that is perpendicular to the flow of the air, i.e. wind. The system requires anchoring systems to secure the pole. In addition, it is generally desirous to have the blades even further from the ground to minimize ground effects.

Unfortunately, prior attempts to produce electrical power from wind have failed to appreciate the benefits of ground effect. Furthermore, some systems have complicated the structures by requiring massive support structures and complicated gearing.

SUMMARY OF THE INVENTION

One aspect of the present invention is a system for generating energy from the movement of air, also referred to as wind, the system comprising: a wind device comprising: a mounting structure for securing to the ground; a horizontal rotatable shaft, rotatably carried by the mounting structure; at least three wind-engaging panels; and at least three panel-mounting frames projecting from the horizontal rotatable shaft with an innermost side nearest to the rotatable shaft and an outermost side farthest from the rotatable shaft, the panel-mounting frame rotatable with the horizontal rotatable shaft, each panel-mounting frame carrying one of the wind-engaging panels wherein there is an air gap between the panel and the rotatable shaft and the panel-mounting frame is weighted on the outermost side; a first wind guide system comprising a first wind block, the first wind guide system for assisting in directing the airflow from a first direction towards the wind-engaging panels while limiting the airflow from the first direction from engaging all the panels at the same time; a second wind guide system comprising a second wind block, the second wind guide system for assisting in directing the airflow from a second direction opposite the first direction towards the wind-engaging panels while limiting the airflow from the second direction from engaging all the panels at the same time; and a mechanism to convert the rotational energy of the shaft into another form of energy, wherein the mechanism to convert the rotational energy of the shaft is a flywheel and the another form of energy is electrical energy.

In one embodiment, the system for generating energy from the movement of air, also referred to as wind is wherein the at least three wind-engaging panels is four wind-engaging panels wherein the airflow engages the panels generally perpendicular to the plane of the panel and in the direction of rotation of the panel.

In one embodiment, the system for generating energy from the movement of air, also referred to as wind is wherein the wind-engaging panels extend to a point near the horizontal shaft defining a gap between the panel and the shaft to allow airflow on all sides of the panel therein creating a low-pressure area behind the panel to assist in the movement of the panel.

In one embodiment, the system for generating energy from the movement of air, also referred to as wind is wherein the panel-mounting frame is a tension compression system.

In one embodiment, the system for generating energy from the movement of air, also referred to as wind is wherein the panel-mounting frame comprises lightweight materials.

In one embodiment, the system for generating energy from the movement of air, also referred to as wind is wherein the panel-mounting frame comprises lightweight materials except for the outermost side of the panel-mounting frame.

In one embodiment, the system for generating energy from the movement of air, also referred to as wind is wherein the panel-mounting frame further comprises one or more weights attached to the outermost side of the panel-mounting frame.

Another aspect of the present invention is a system for generating energy from the movement of air, also referred to as wind, the system comprising: a wind device comprising: a mounting structure for securing to the ground; a horizontal rotatable shaft, rotatably carried by the mounting structure; at least three wind-engaging panels; and at least three panel mounting frames projecting from the horizontal rotatable shaft with an innermost side nearest to the rotatable shaft and an outermost side farthest from the rotatable shaft, the panel mounting frame rotatable with the horizontal rotatable shaft, each panel mounting frame carrying one of the wind-engaging panels wherein there is an air gap between the panel and the rotatable shaft and the panel mounting frame is weighted on the outermost side; a first wind guide system comprising a first wind block, the first wind guide system for assisting in directing the airflow from a first direction towards the wind-engaging panels while limiting the airflow from the first direction from engaging all the panels at the same time; a second wind guide system comprising a second wind block, the second wind guide system for assisting in directing the airflow from a second direction opposite the first direction towards the wind-engaging panels while limiting the airflow from the second direction from engaging all the panels at the same time; and a mechanism to convert the rotational energy of the shaft into another form of energy, wherein the mechanism to convert the rotational energy of the shaft is a permanent magnetic generator and the another form of energy is electrical energy.

In one embodiment, the system for generating energy from the movement of air, also referred to as wind is wherein the at least three wind-engaging panels is four wind-engaging panels wherein the airflow engages the panels generally perpendicular to the plane of the panel and in the direction of rotation of the panel.

In one embodiment, the system for generating energy from the movement of air, also referred to as wind is wherein the wind-engaging panels extend to a point near the horizontal shaft defining a gap between the panel and the shaft to allow airflow on all sides of the panel therein creating a low-pressure area behind the panel to assist in the movement of the panel.

In one embodiment, the system for generating energy from the movement of air, also referred to as wind is wherein the panel-mounting frame is a tension compression system.

In one embodiment, the system for generating energy from the movement of air, also referred to as wind is wherein the panel-mounting frame comprises lightweight materials.

In one embodiment, the system for generating energy from the movement of air, also referred to as wind is wherein the panel-mounting frame comprises lightweight materials except for the outermost side of the panel-mounting frame.

In one embodiment, the system for generating energy from the movement of air, also referred to as wind is wherein the panel-mounting frame further comprises one or more weights attached to the outermost side of the panel-mounting frame.

Another aspect of the present invention is a system for generating energy from the movement of air, the system comprising: a plurality of wind devices, each wind device including: a mounting structure for securing to the ground; a horizontal rotatable shaft, rotatably carried by the mounting structure; at least three wind-engaging panels; and at least three panel mounting frames projecting from the horizontal rotatable shaft with an innermost side nearest to the rotatable shaft and an outermost side farthest from the rotatable shaft, the panel mounting frame rotatable with the horizontal rotatable shaft, each panel mounting frame carrying one of the wind-engaging panels wherein there is an air gap between the panel and the rotatable shaft and the panel mounting frame is weighted on the outermost side; a first wind guide system comprising a first wind block, the first wind guide system for assisting in directing the airflow from a first direction towards the wind-engaging panels while limiting the airflow from the first direction from engaging all the panels at the same time; a second wind guide system comprising a second wind block, the second wind guide system for assisting in directing the airflow from a second direction opposite the first direction towards the wind-engaging panels while limiting the airflow from the second direction from engaging all the panels at the same time; and a mechanism to convert the rotational energy of the shaft into another form of energy wherein the mechanism to convert the rotational energy of the shaft is a flywheel and the another form of energy is electrical energy.

In one embodiment, the system for generating energy from the movement of air is wherein the plurality of the wind devices are aligned with each and have a common horizontal rotatable shaft.

In one embodiment, the system for generating energy from the movement of air is wherein the panel mounting frames are staggered.

In one embodiment, the system for generating energy from the movement of air is wherein the panel-mounting frame is a tension compression system.

In one embodiment, the system for generating energy from the movement of air is wherein the panel-mounting frame comprises lightweight materials except for the outermost side of the panel-mounting frame.

In one embodiment, the system for generating energy from the movement of air is wherein the panel-mounting frame further comprises one or more weights attached to the outermost side of the panel-mounting frame.

BRIEF DESCRIPTION OF THE DRAWINGS

These and other features and advantages of the present invention will be better understood by reading the following detailed description of embodiments, taken together with the drawings wherein.

DETAILED DESCRIPTION OF EMBODIMENTS

There are numerous factors that cause the movement of air or wind. These factors include differential heating between the equator and the poles and the rotation of the planet.

A system and method of generating energy by transforming energy from a low-density substance, such as airflow or wind, into kinetic energy by directing the flow through a wind guide system towards panels that rotate in generally the same directions as the airflow. Furthermore, the system uses the ground and/or water as a surface for guiding the airflow towards the windmill devices. The wind guide system also limits airflow from engaging all the panels at the same.

Figure 1:
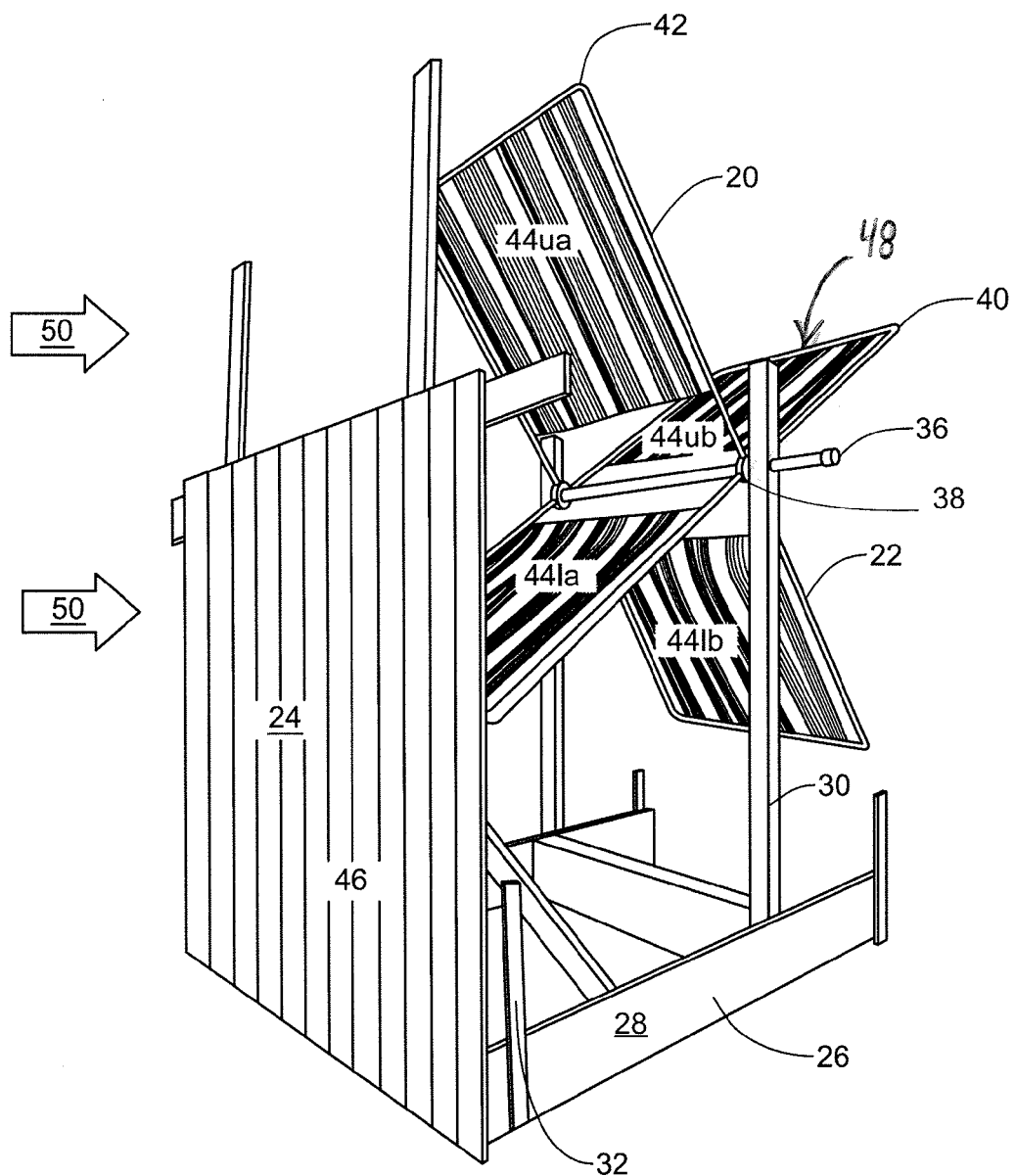
FIG. 1 is a perspective view of a system for generating energy from the movement of air.

Referring to FIG. 1, a system 20 having a windmill device 22 and a wind guide system 24 is shown. The windmill device 22 has a mounting structure 26. In the embodiment shown, the mounting structure 26 is a ground structure 28 having an "H" shaped structure and a pair of vertical mounting poles 30. In addition, the mounting structure 26 has four leveling poles 32, only three seen in the FIG.

The windmill device 22 has a horizontal rotatable shaft 36. The rotatable shaft 36 is carried by the pair of vertical mounting poles 30 of the mounting structure 26.

The windmill device 22 has a plurality of wind-engaging structures 40. In the embodiment shown, there are four wind-engaging structures 40 secured to the horizontal rotatable shaft 36. Each of the wind-engaging structures 40 has a frame 42, which in the embodiment shown is "U" shaped. The frame 42 is secured to the rotatable shaft 36 by a pair of hubs 38. The hubs can act as electric generators that convert the rotational energy of the shaft 36 into electrical power. The frame 42 carries a wind-engaging panel 44. In certain embodiments, the wind-engaging structure comprises a tension compression system. The tension compression system is constructed of lightweight materials including, but not limited to, aluminum frames, polymer frames, and the like. However, the outermost edge of the panel-mounting frame is weighted 48 such that it increases the moment of inertia of the rotating rotatable shaft 36. The weighted outermost edge 48 can comprise a steel bar in place of the lightweight frame portion, or can comprise additional weights added to that portion of the panel-mounting frame.

Still referring to FIG. 1, the wind guide system 24 includes a wind block 46 that limits airflow towards the lower wind-engaging panels 441*a* and 441*b*. The airflow 50 hits the wind engaging panel 44*ua* and pushes the panel therein rotating the shaft 36.

Figure 2:
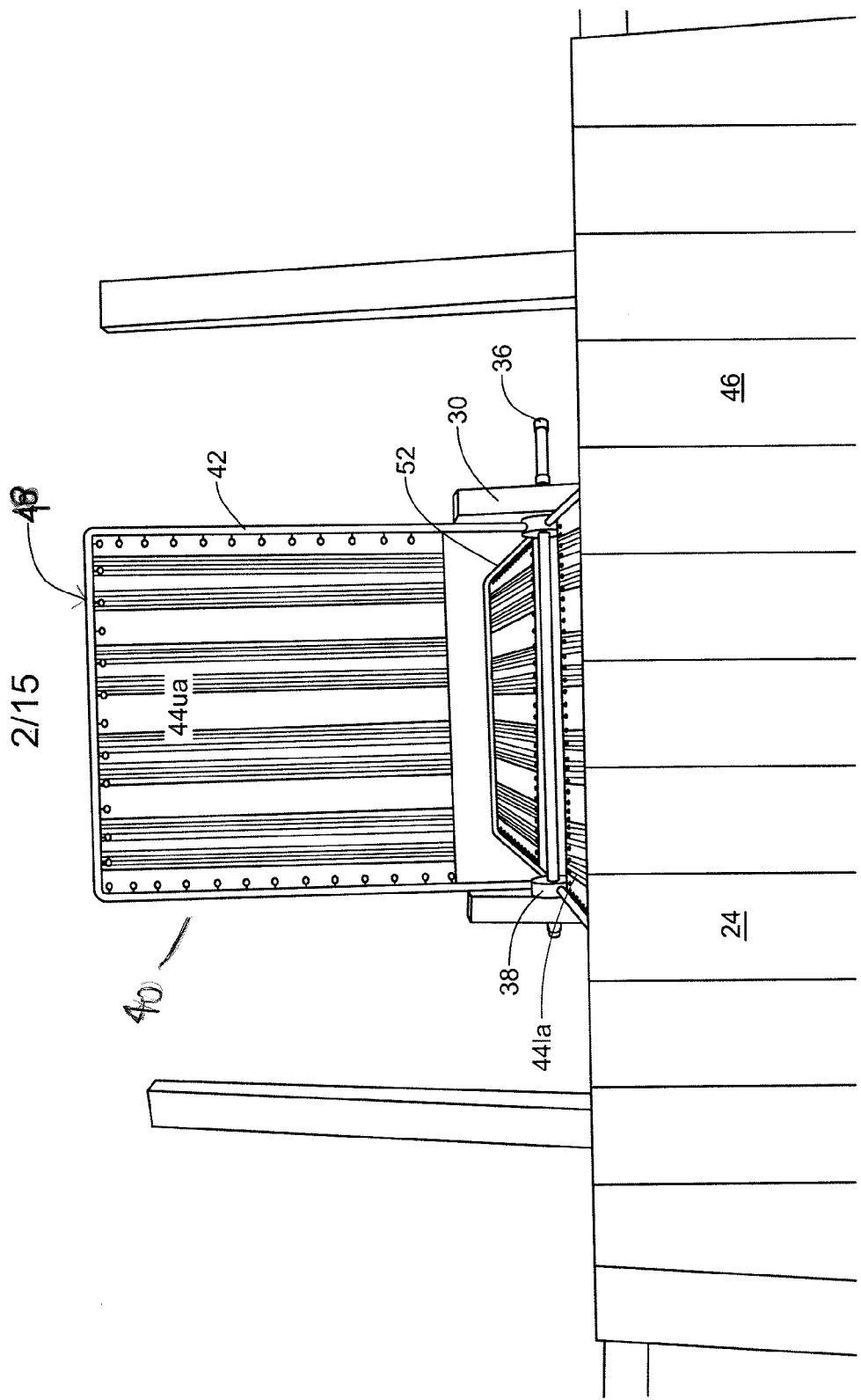
FIG. 2 is a front view of the system for generating energy from the movement of air.

Referring to FIG. 2, a front view of the system 20 with the wind block 46 diverting airflow from the lower wind-engaging panel 441*a*. As the airflow rotates the wind-engaging structures 40 about the horizontal rotatable shaft 36 of the windmill device 22, the panel 44 that is engaged by the airflow changes. While the panels 44 are labeled dependent on their position in a particular figure, as the wind-engaging structures 40 rotate on the windmill device 22, each panel 44 will be in all positions.

Figure 3:
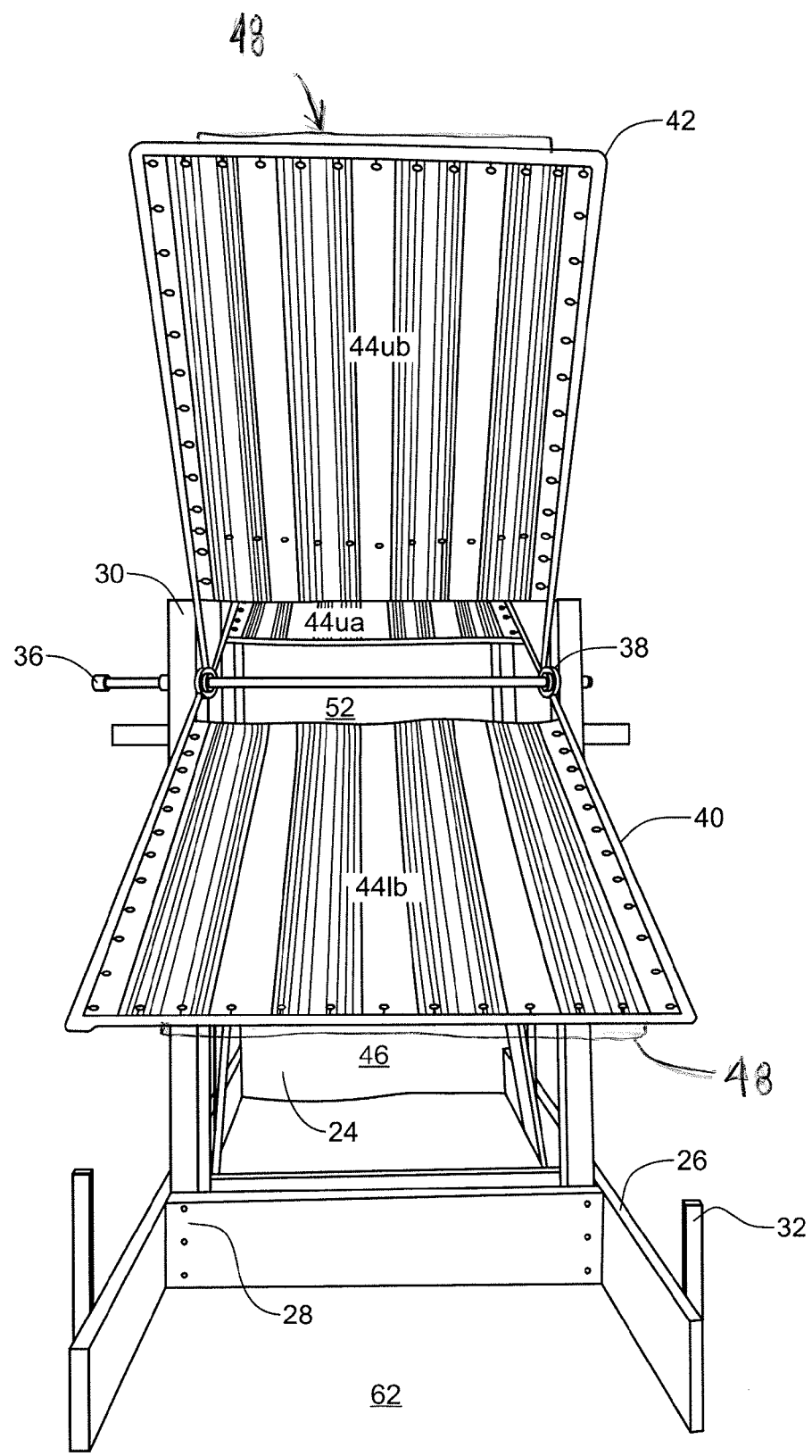
FIG. 3 is a rear view of the system for generating energy from the movement of air.

Referring to FIG. 3, a rear view of the system 20 for generating energy from the movement of air is shown. A pair of the leveling poles 32 are shown raising a portion of the ground structure 28 above the earth or ground. The lower wind-engaging panel 441*b* shown is generally not affected by wind flow in its current position since the wind block 46, a portion shown at the rear of the FIG, blocks the airflow, wind, from engaging the lower wind-engaging panels. The upper wind-engaging panel 44*ub*, shown in forward of the figure, is being forced downward by the airflow. The upper wind-engaging panel 44*ua*, shown in the rear of the figure, is engaged with the majority of the airflow directed by the wind guide system 24 including the wind block 46.

Still referring to FIG. 3, the wind-engaging structure 40 has a gap 52 between each of the wind-engaging panels 44 and the horizontal rotatable shaft 36. The gap 52 in combination with the wind-engaging panel 44 creates a venturi effect and lower pressure behind the wind-engaging panel 44. The lower pressure assists in the rotation of the windmill device 22 by drawing the wind-engaging structure 40 in the same direction as the airflow forces the panels 44.

By weighting the outermost edge 48 of the panel-mounting frame, the moment of inertia of the horizontal rotatable shaft 36 is increased. The weights applied to the panel-mounting frame must be balanced in relation to each other to work effectively and must be symmetrical about the rotatable shaft 36. The total amount of weight added to each panel-mounting frame is dependent on the structure and scale of the wind-engaging device. By adding the weights, the energy required to stop the structure, once it is in motion, is increased. This allows the electric generator 38, which is a braking device, to produce a more even supply of electrical energy despite the variable nature of the airflow source. FIG. 3 shows the outermost edge 48 of the panel-mounting frame with an attached weight, but one of ordinary skill in the art can appreciate that the material used for the outermost edge of the panel-mounting frame could also be made of a heavier material than the rest of the panel-mounting frame and therefore act as a "weight." The key is to apply the added weight out a radius as far a practicable from the rotating shaft 36, here at the ends of the panels, in a balanced manner from panel to panel, and symmetrically about the rotatable shaft.

Figure 4:
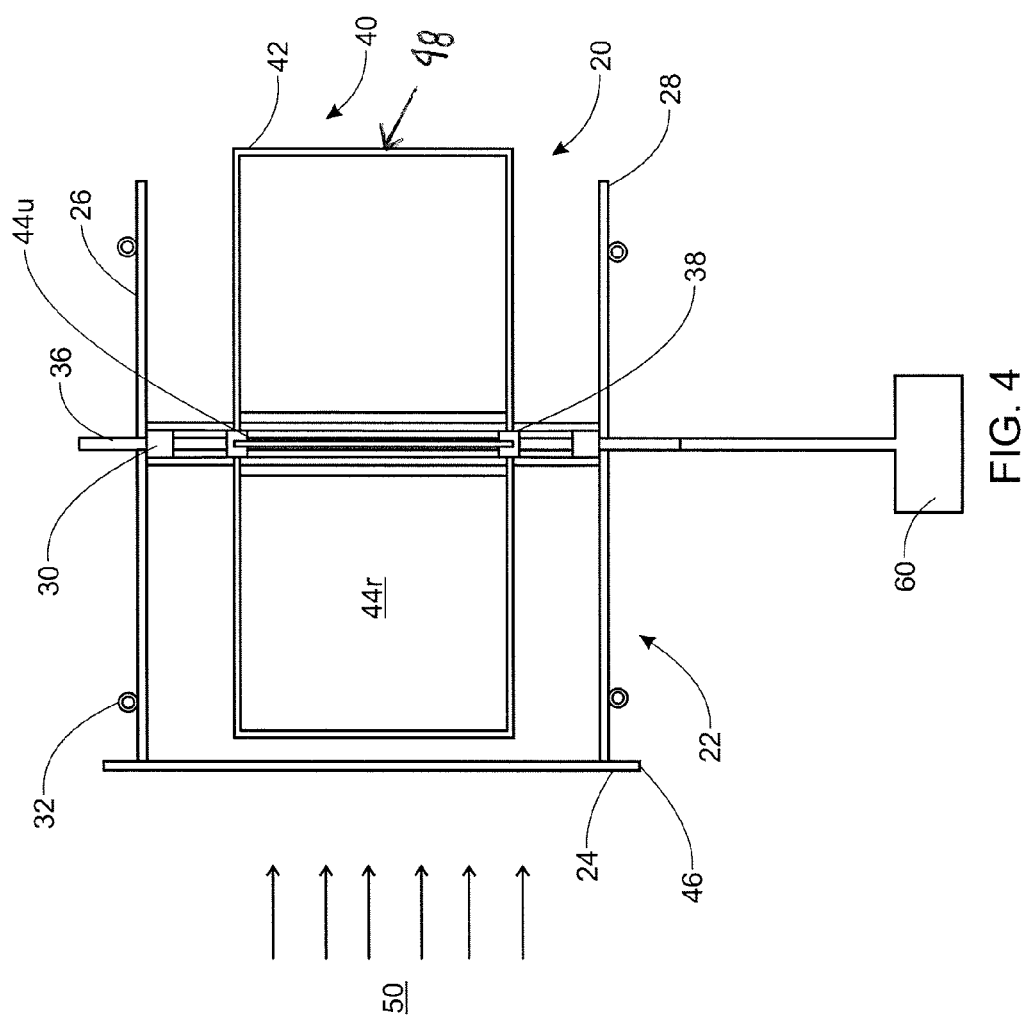
FIG. 4 is a schematic top view of the system for generating energy from the movement of air.

Referring to FIG. 4, a schematic top view of the system 20 for generating energy from the movement of air is shown. The wind guide system 24 includes the wind block 46. The windmill device 22 of the system 20 includes the mounting structure 26. The mounting structure 26 has the ground structure 28 and the leveling poles 32. The horizontal rotatable shaft 36 extends between the pair of mounting poles 30.

The wind-engaging panel 44*u*, which is projecting vertically out of the page, is hit by the airflow 50, which because of the orientation of the system 20 moves the wind-engaging panel 44*u* to the right in the FIG. The wind-engaging panel 44*r*, the panel 44 near the wind block 46, is rotated upward by the rotation of the rotatable shaft 36, which is being rotated by the force of the airflow on the wind-engaging panel 44*u*. As the wind-engaging panel 44*r* rotates upward, the airflow will engage the panel 44 and assist in the rotation of the rotatable shaft 36.

Still referring to FIG. 4, the horizontal rotatable shaft 36 is attached to a generator 60 that converts the rotational energy of the shaft 36 into electrical power. In one embodiment, the generator 60 is a flywheel generator. The flywheel generator 60 is a three-phase 12-pole brushless permanent magnet generator. The stator has three-phase winding. The rotor has the 12 high-energy rare earth permanent magnets.

In another embodiment, the rotatable shaft 36 is attached to the frame via a pair of hubs 38, where the hub 38 acts as a generator. In one embodiment, the generator 38 is a flywheel generator. The flywheel generator 38 is a three-phase 12-pole brushless permanent magnet generator. The stator has three-phase winding. The rotor has the 12 high-energy rare earth permanent magnets.

Figure 5A:
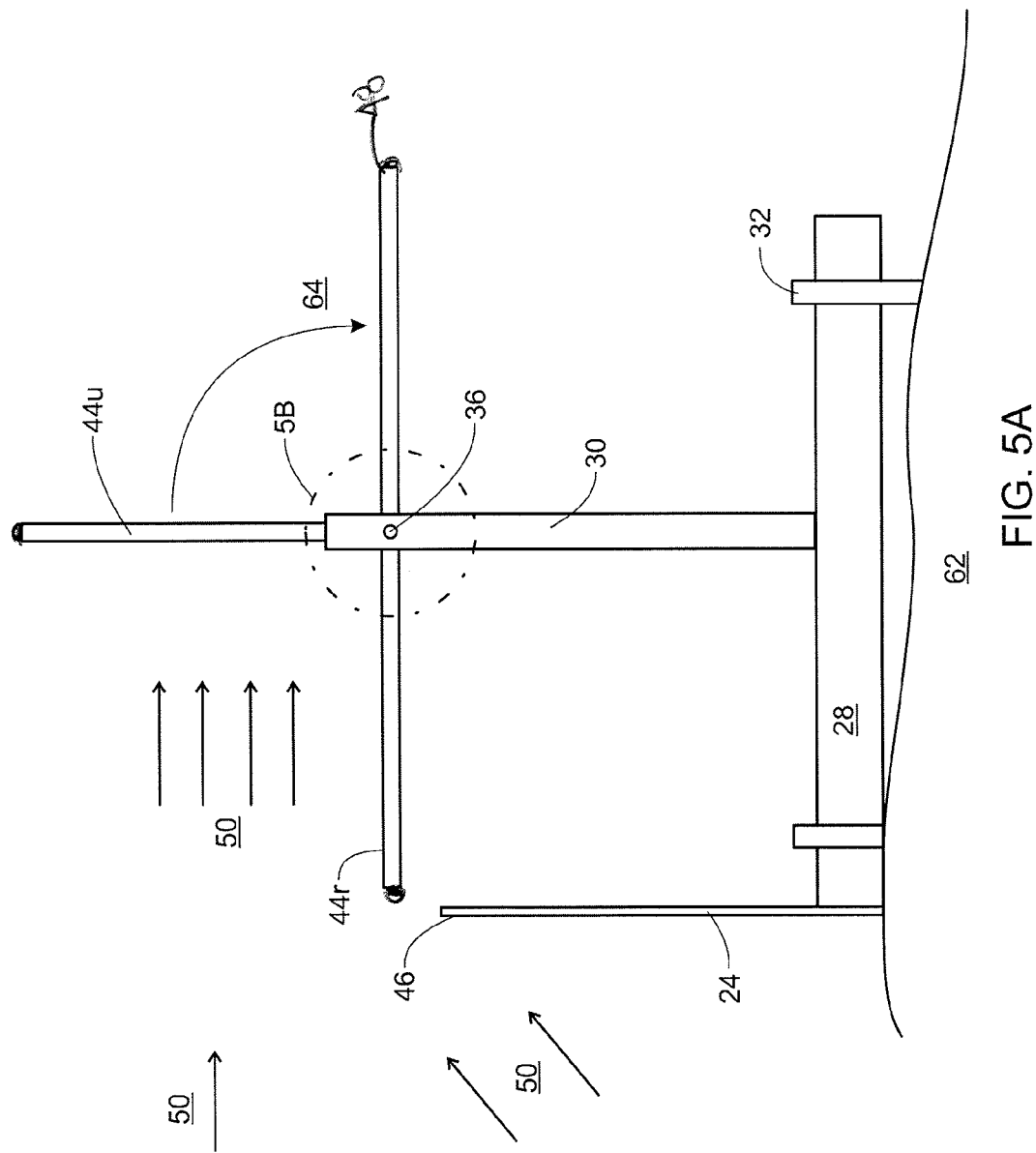
FIG. 5A is a schematic side view of the system for generating energy from the movement of air.

Referring to FIG. 5A, a schematic side view of the system 20 for generating energy from the movement of air is shown. The wind guide system 24 includes the wind block 46, which is shown to the left of the windmill device 22 in the FIG. The mounting structure 26 includes the ground structure 28 and the leveling poles 32. The leveling poles 32 raise the rear portion of the ground structure 28, on the right side of the FIG. 5A, above the ground surface 62.

The airflow 50 hits the wind-engaging panel 44*u* causing the wind-engaging panels 44 to rotate in a clockwise direction, as represented by arrow 64, therein rotating the horizontal rotatable shaft 36 in a clockwise direction. As indicated above with respect to FIG. 4, the wind-engaging panel 44*r*, the panel 44 near the wind block 46 is rotated upward by the rotation of the rotatable shaft 36, which is being rotated by the force of the airflow on the wind-engaging panel 44*u*. As the wind-engaging panel 44*r* rotates upward, the airflow will engage the panel 44 and assist in the rotation of the rotatable shaft 36.

Figure 5B:
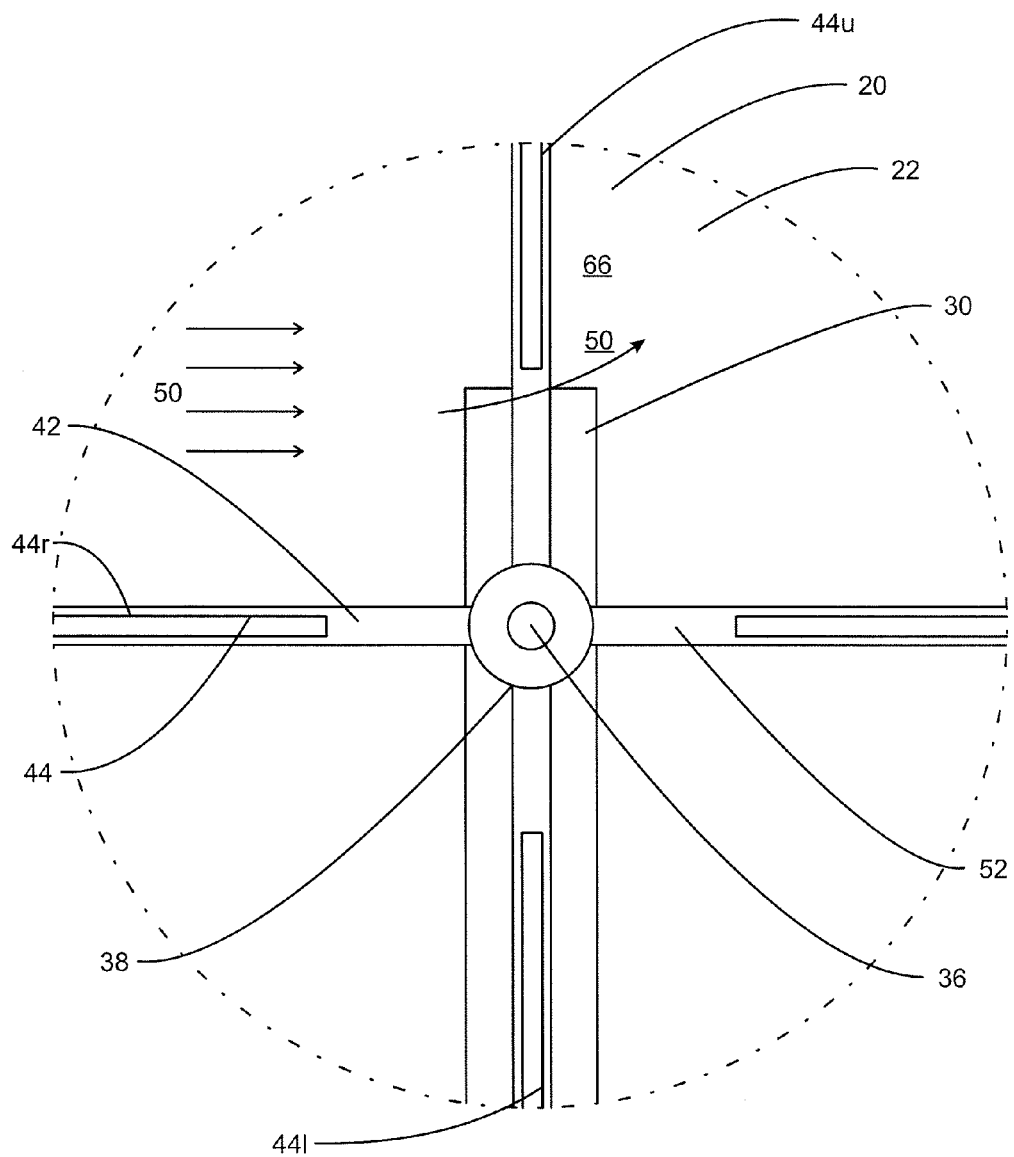
FIG. 5B is an enlarged portion of the schematic side view of FIG. 5A showing a portion of the system.

Referring to FIG. 5B, an enlarged portion of the schematic side view of FIG. 5A showing a portion of the windmill device 22 of the system 20 is shown. The frame 42 of the wind-engaging structure 40 is connected to the hubs 38 that rotate with the horizontal rotatable shaft 36 and act as generators. The frame 42 retains the wind-engaging panel 44 which in the embodiment shown is made of fabric such as awning canvas. The wind-engaging panel 44 is spaced from the hubs 38 and the horizontal rotatable shaft 36. The gap 52 between the horizontal rotatable shaft 36 and the wind-engaging panel 44 allows a portion of the airflow 50 to create a low-pressure zone 66 behind the wind-engaging panel 44, on the side opposite from the side engaged by the airflow. It is recognized also that the airflow 50 going around the wind block 46 creates a low-pressure zone 66 behind the block 46.

In one embodiment, each of the four panels 44 is formed of awning canvas. Each panel 44 is generally 5 feet wide by 8 feet tall. The air gap 52 between the panel 44 and the rotatable shaft 33 is approximately 1 foot. The farther the surface area of the panel 44 is from rotating shaft the more the torque.

Lightweight materials are generally preferred for the construction of the frame for the wind-engaging system. Generally, the lighter the material, the lower the cost of construction. Furthermore, in certain embodiments, the system is constructed as a tension and compression system using tubing and guide wires, and the like. In certain embodiments, the addition of weights to the outermost edge of the panel-mounting frame can be used to increase the moment of inertia of the rotating rotatable shaft 36 thereby making it capable of producing a larger and more even supply of electricity.

Figure 6:
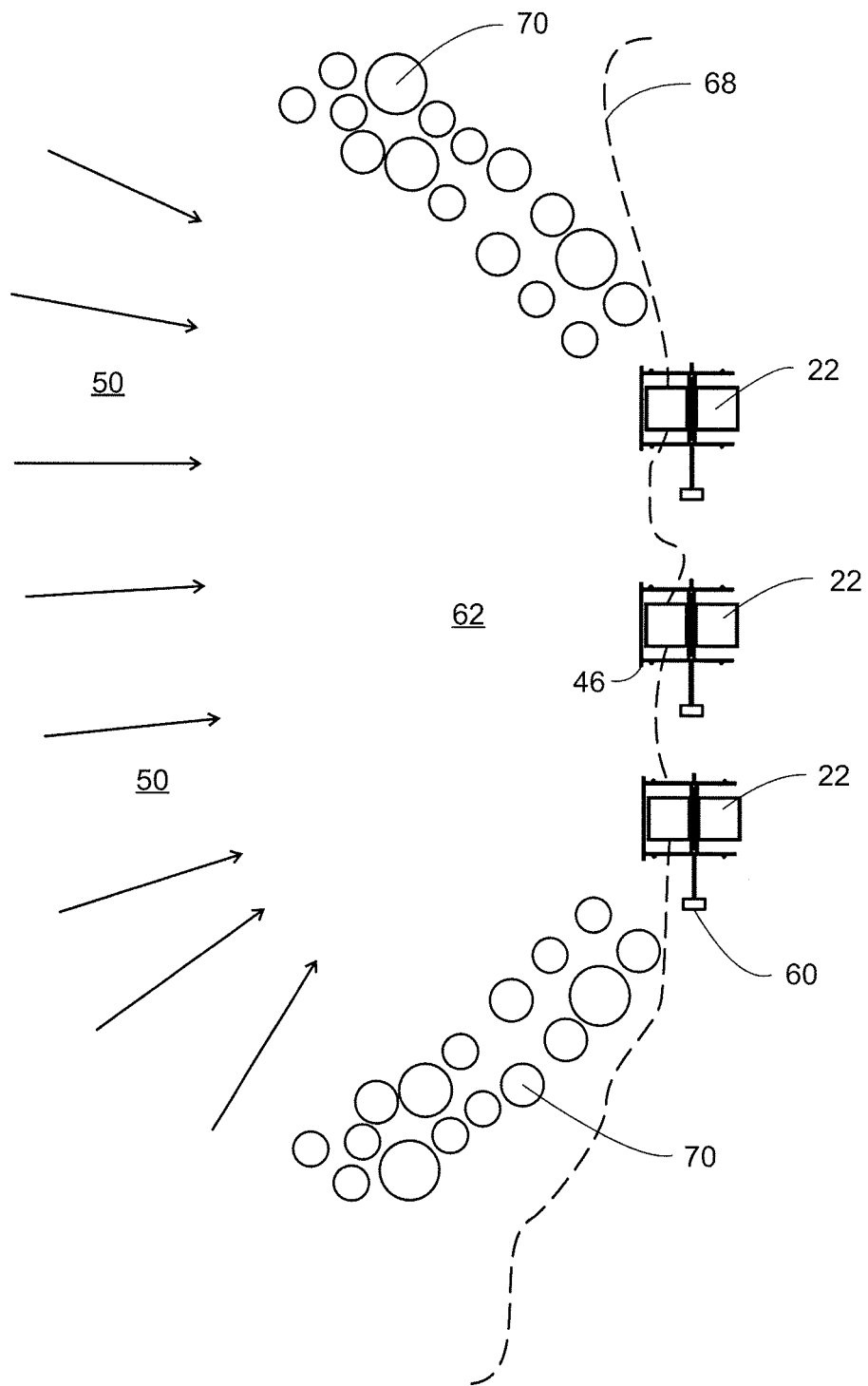
FIG. 6 is a schematic top view of the system for generating energy from the movement of air showing a plurality of windmill devices.

Referring to FIG. 6, a schematic top view of the system 20 showing a plurality of windmill devices 22 and a wind guide system 24 is shown. The system 20 is placed in proximity to a ridge of a mountain or hill. The ridge 68 is symbolized by the dash line 68. The wind guide system 24 of the system 20 includes a series of trees or brush 70 that block or limit the flow of air over the ridge 68 at certain locations and direct such flow towards the windmill devices 22. The system 20 shows three (3) windmill devices 22 located at the ridge. Each of the windmill devices 22 has a wind block 46 as part of the wind guide system 24 as explained above with respect to FIGS. 1-5B.

As indicated above, the system 20 uses the existing ground surface 62 to assist in guiding the airflow 50 to the windmill device 22. This is in contrast to conventional windmills that are positioned so that the blades are not in proximity to the ground. The placement of natural products such as trees or brush 70 does not detract from the view in proximity to the windmill devices 22 while guiding the airflow 50 as part of the system 20.

In some embodiments, the windmill device 22 and the wind block 46 can have artwork to complement the surroundings or to make a statement. Likewise, the wind block 46 could have bushes located in proximity to hide the wind block 46 and the panels 44 could be of a neutral color to blend with the environment.

Figure 7:
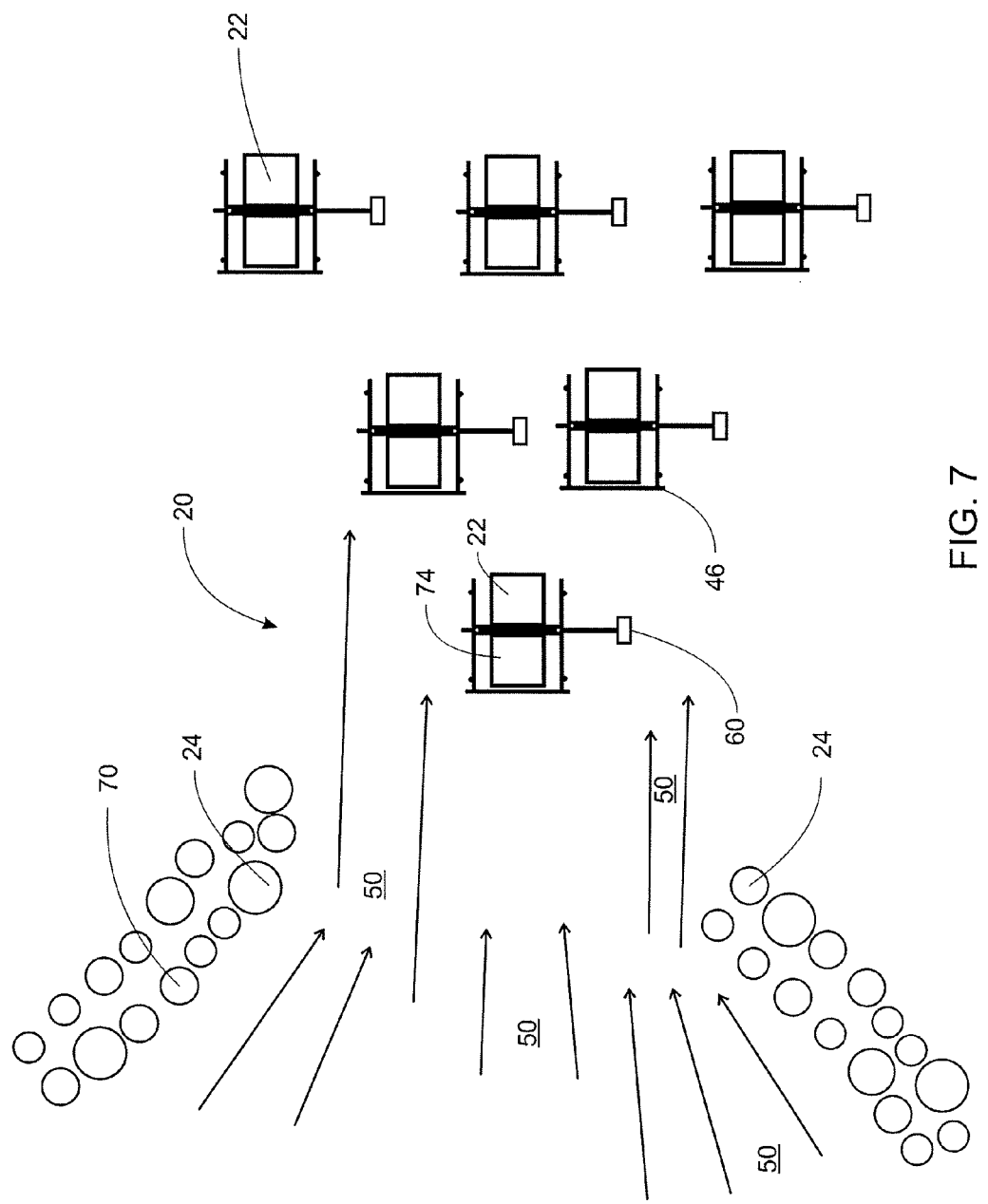
FIG. 7 is a schematic top view of an alternative system with another arrangement of a plurality of windmill devices.

As indicated above, the windmill devices 22 are generally placed to work with the existing environments. Referring to FIG. 7, a schematic top view of an alternative system 20 with another arrangement of a plurality of windmill devices 22 is shown. The topography in this embodiment has a general open area with a prevailing wind in one direction. The system 20 includes the wind guide system 24 having a series of trees or brush 70 that block or limit the flow of air across a portion of the general open area and direct such flow towards a windmill device 22. Behind the windmill device 22 is a series of additional windmill devices 22 that are arranged in a "V" shape or triangular pattern.

The trees 70 and/or brush 70 of the wind guide system 24 guides the airflow 50 generally to the first or head pin windmill device 74. As the airflow 50 spreads out after passing through the head pin windmill device 74, the other five (5) windmill devices 22 in the embodiment shown extract more energy.

Figure 8:
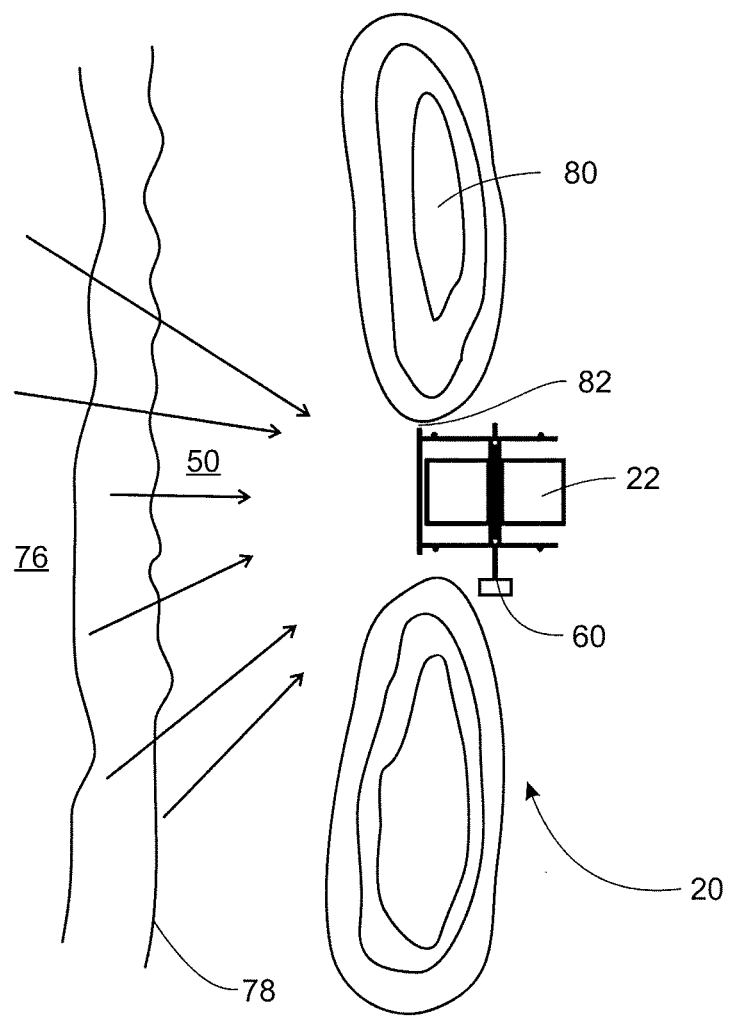
FIG. 8 is a schematic top view of an alternative system with a windmill device near the ocean.

FIG. 8 is a schematic top view of an alternative system 20 with a windmill 22 device near the water. The body of water 76, such as an ocean or lake, presents an area from which wind flow can be directed to a system for generating energy from the movement of air 20. The system 20 located on the shores 78 near the body of water 76 has a pair of berms or sand dunes 80 that form a portion of the wind guide system 20. In the embodiment shown, a single windmill device 22 is positioned in a space 82 between the dunes 80. Each of the windmill devices 22 has a wind block 46 as part of the wind guide system 24 as explained above with respect to FIGS. 1-4.

Figure 9:
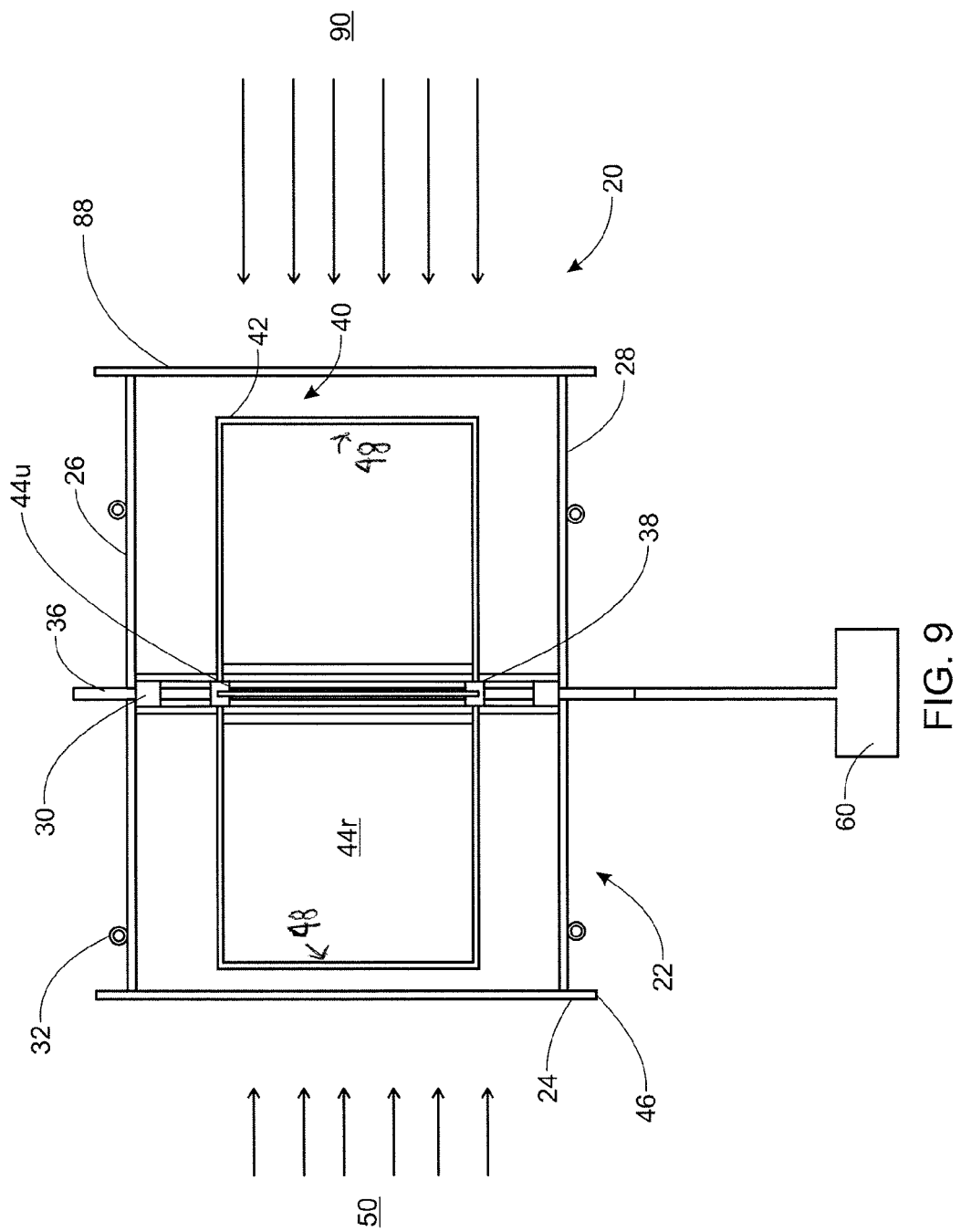
FIG. 9 is a schematic top view of an alternative system for generating energy from the movement of air.

Referring to FIG. 9, a schematic top view of an alternative system for generating energy from the movement of air is shown. The wind guide system 24 includes the wind blocks 46 and 88. Similar to the previous embodiments, the windmill device 22 of the system 20 of this embodiment includes the mounting structure 26. The mounting structure 26 has the ground structure 28 and the leveling poles 32. The horizontal rotatable shaft 36 extends between the pair of mounting poles 30.

The wind-engaging panel 44*u*, which is projecting vertically out of the page, is hit by the airflow 50, which because of the orientation of the system 20 moves the wind-engaging panel 44*u* to the right in the FIG. The wind-engaging panel 44*r*, the panel 44 near the wind block 46, is rotated upward by the rotation of the rotatable shaft 36, which is being rotated by the force of the airflow on the wind-engaging panel 44*u*. As the wind-engaging panel 44*r* rotates upward, the airflow will engage the panel 44 and assist in the rotation of the rotatable shaft 36.

In contrast to the previous embodiment, the system 20 has the additional wind block 88 of the wind guide system 24. The wind block 88 guides the airflow when the air flow is coming from the opposite direction than represented by the arrows 50. The airflow in the other direction is represented by the arrows 90. In certain locations, the airflow will generally be in one direction as represented by airflow arrows 50. However, in certain situations, typically less than twenty five (25) percent of the time, the airflow will be in the opposite direction as represented by arrows 90.

Still referring to FIG. 9, the horizontal rotatable shaft 36 is attached to a generator 60 that converts the rotational energy of the shaft 36 into electrical power. The system 20 will allow power to be generated regardless if the shaft 36 is rotating clockwise as seen in FIG. 5A or in a counterclockwise direction. In certain embodiments, the hub 38 acts as a generator that converts the rotational energy of the shaft 36 into electrical power. The system 20 will allow power to be generated regardless if the shaft 36 is rotating clockwise as seen in FIG. 5A or in a counterclockwise direction. In an embodiment, the generator 60 or 38 is a flywheel generator. The flywheel generator 60 or 38 is a three-phase 12-pole brushless permanent magnet generator. The stator has three-phase winding. The rotor has 12 high-energy rare earth permanent magnet.

The addition of weight to the outermost edge of the panel-mounting frame increases the moment to inertia of the rotating rotatable shaft 36. A generator, which is a braking system, can extract more energy, more evenly, from the rotating rotatable shaft with an increased moment of inertia. Any dips in the energy source (i.e. the natural variability of wind) can be evened out. By creating a more even supply of electrical energy, the energy can be tied into the grid more reliably.

Figure 10:
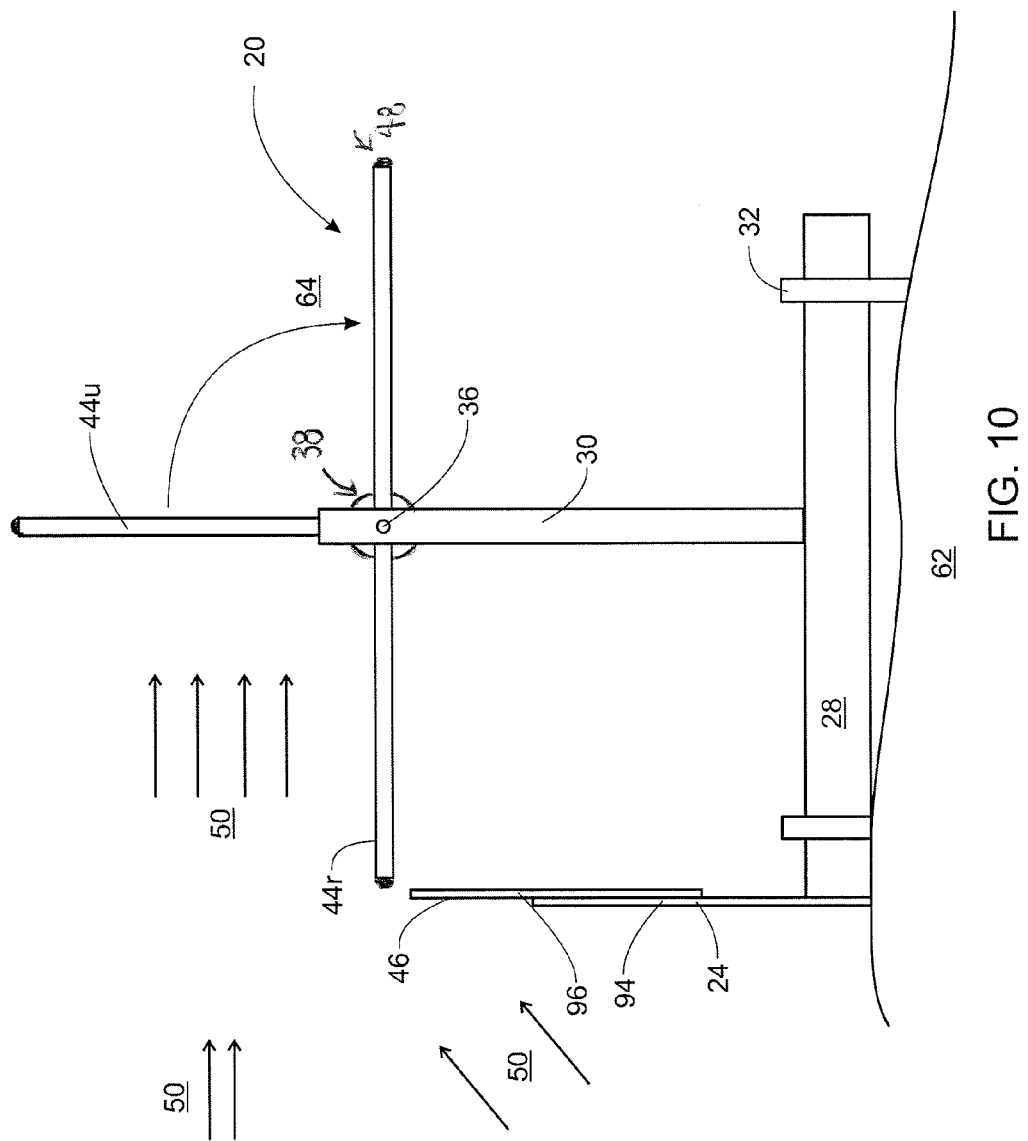
FIG. 10 is a schematic side view of an alternative system for generating energy from the movement of air.

Referring to FIG. 10, a schematic side view of an alternative system for generating energy from the movement of air is shown. The wind guide system 24 includes the wind block 46, which is shown to the left of the windmill device 22 in the FIG. The wind block 46 has a pair of panels 94 and 96. The upper panel 96 is adjustable relative to the lower panel 94 and the windmill device 22. The wind block 46 can be adjusted dependent on several factors including the direction and velocity of the airflow movement. It recognized that the embodiment shown in FIG. 9 and other embodiments can have adjustable panels 96.

Figure 11:
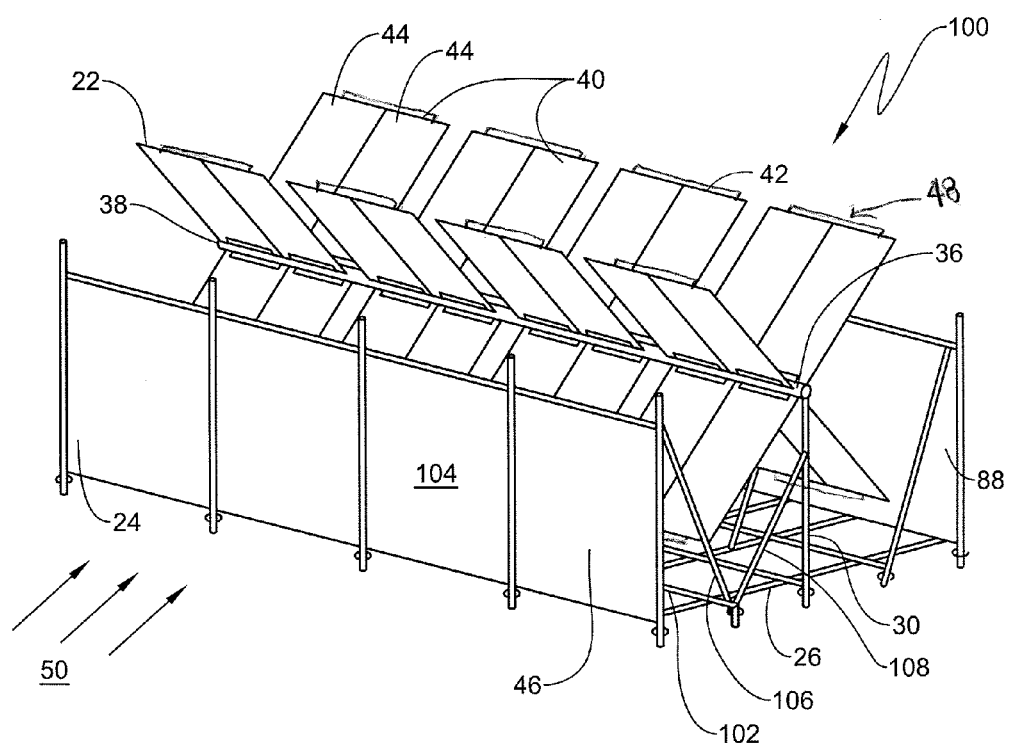
FIG. 11 is a perspective view of another alternative system for generating energy from the movement of air.

Referring to FIG. 11, a perspective view of an alternative system 100 for generating energy from the movement of air is shown. The system 100 has a windmill device 22 and a wind guide system 24. The windmill device 22 has a mounting structure 26, a plurality of vertical mounting poles 30, and a horizontal rotatable shaft 36. The windmill device 22 in addition has a plurality of wind-engaging surfaces 40. In the embodiment shown, there are four (4) sets of wind-engaging structures each set having four (4) wind-engaging structures 40 secured to the horizontal rotatable shaft 36. Each of the wind-engaging structures 40 has a frame 42, which in the embodiment shown is a pair of rectangles. The frame 42 is secured to the rotatable shaft 36 by a series of hubs 38 that acts as generators. The frame 42 carries a pair of wind engaging panels 44 that each have a weighted outermost edge 48.

While the four (4) sets of four (4) wind-engaging structures 40 are shown aligned with each other, it is recognized that each set could be offset. For example, it may be determined that the primary direction of the wind cannot be exactly perpendicular to the wind-engaging structures 40 so therefore a slight off-set of each wind-engaging structure 40 is more beneficial.

Still referring to FIG. 11, similar to FIG. 9 the system 100 has a pair of wind blocks 46 and 88 of the wind guide system 24 wherein the wind blocks 46 and 88 guide the airflow when the airflow is coming from either the primary direction or a direction 180° from the primary direction. Both the wind blocks 46 and 88 in the embodiment shown are formed similar to the wind-engaging structures 40 by a frame 102 and a panel 104.

The frame 102 of the wind guide system 24 is tied to the mounting structure 26 of the windmill device 22. In the embodiment shown, a stiffening arm 106 extends from the top of the wind block 88 of the wind guide system 24 to the mounting structure 26. A similar stiffening arm 108 is located from vertical mounting poles 30 to which the rotatable shaft 36 is mounted.

Figure 12:
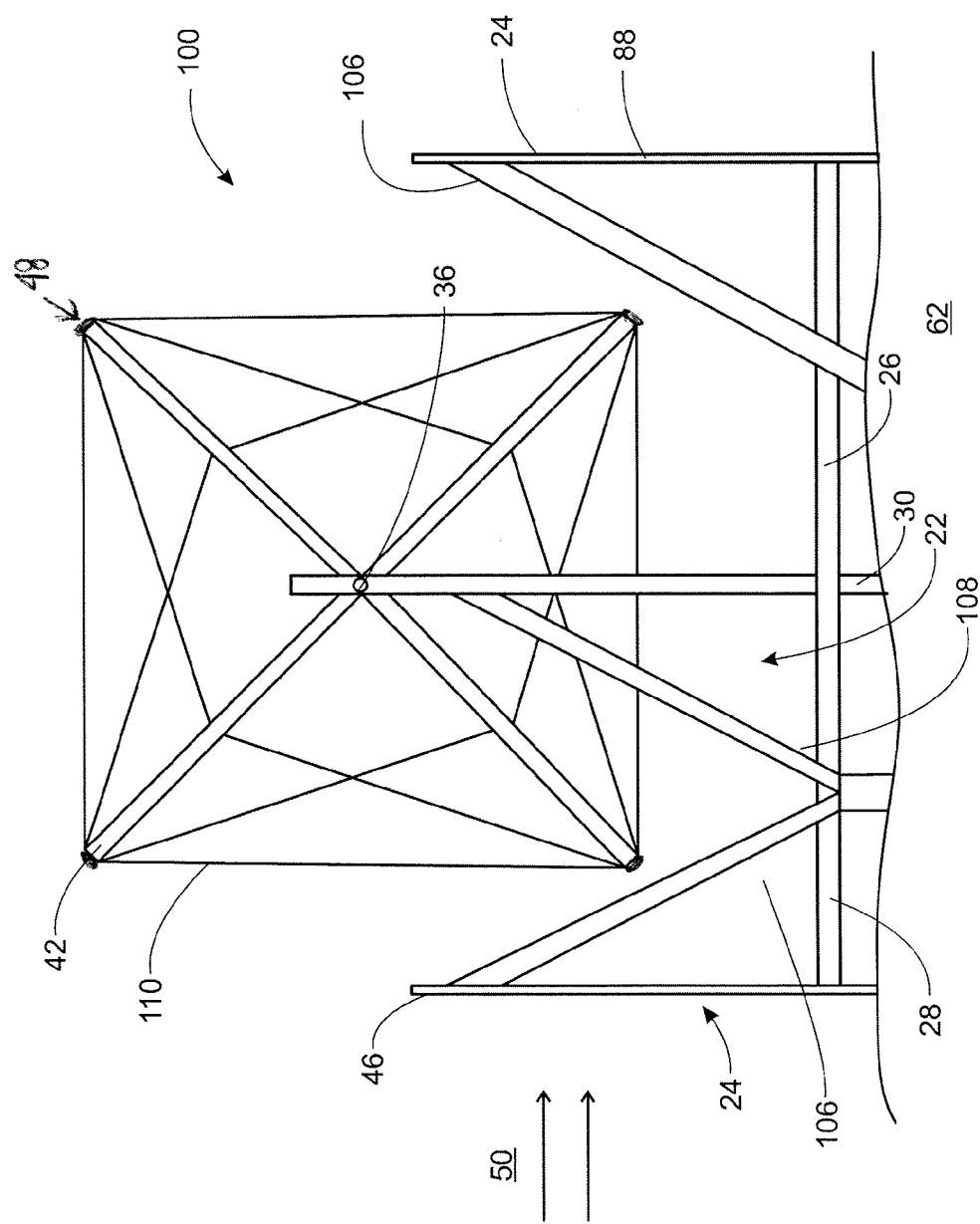
FIG. 12 is a side view of the alternative system of FIG. 11.

Referring to FIG. 12, a side view of the alternate structure of FIG. 11 is shown. A series of guide wires 110 extend between the frames 42 of adjacent wind-engaging structures 40 to stiffen the structure and allow the system 100 to be used in various weather conditions including when the system is exposed to snow and ice. The stiffening arms 108 are shown extending from the vertical mounting poles 30, which hold the rotatable shaft 36. The stiffening arms 106 are also shown extending from the top of the wind blocks 46 and 88 to the mounting structure 26.

Figure 13:
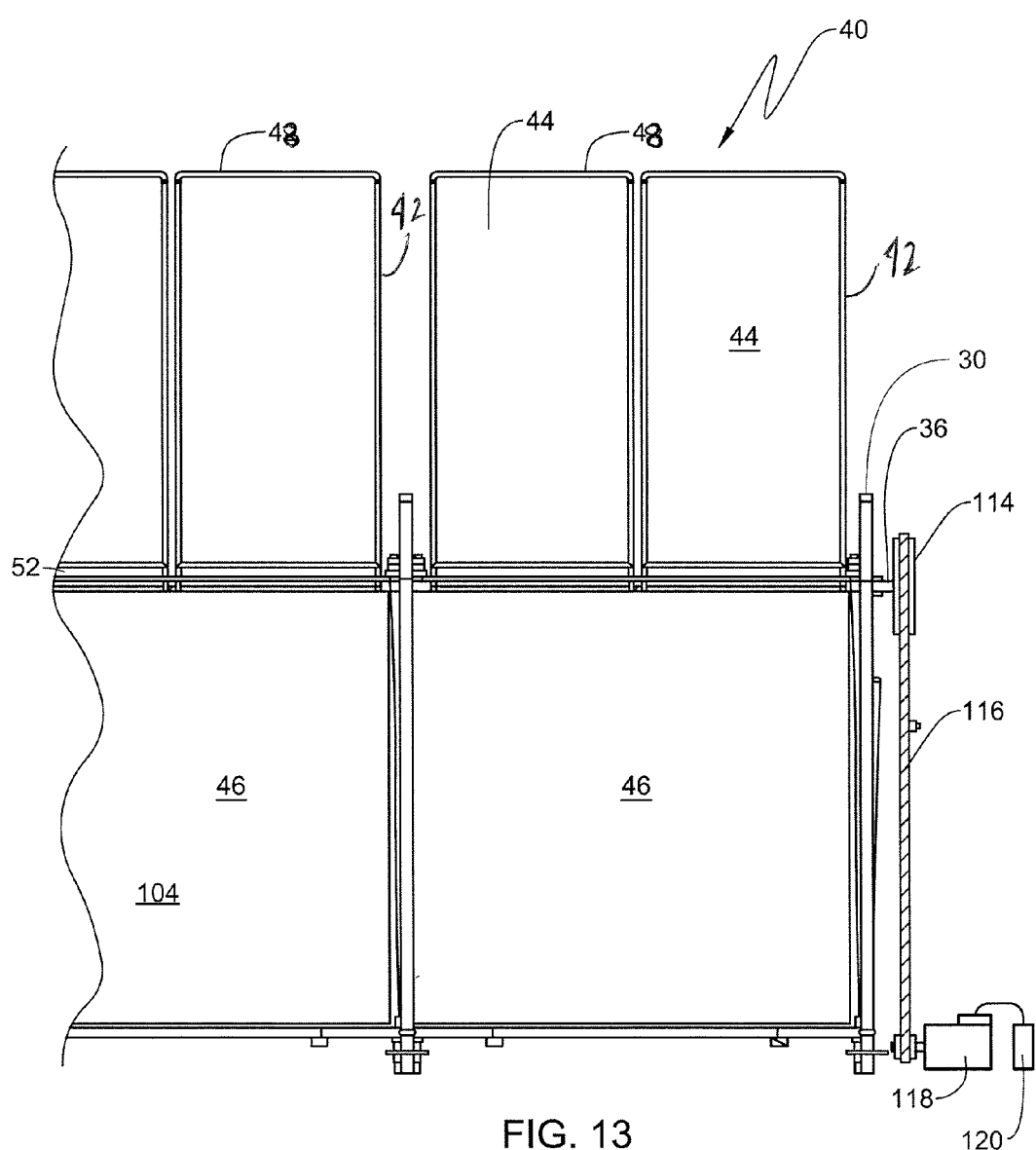
FIG. 13 is a front view of the alternative system of FIG. 11.

Referring to FIG. 13, a front view of the alternative structure 100 of FIG. 11 is shown. The wind block 88 is shown limiting the airflow to all but one of the wind-engaging structures 40. On the right side of the FIG. a pulley 114 is connected to the rotatable shaft 36. A belt 116 extends from the pulley 114 to a generator 118 such that as the wind, the airflow 50, hits the wind-engaging structure 40 the generator 118 rotates to generate electricity. The system 100 has an inverter 120, which converts the direct current (DC) power from the generator 118 to alternative current (AC) power.

In one embodiment, the generator 118 can be a permanent magnetic (PM) generator such as marketed by Inergy of Plantation, Fla. The PM generator can produce power for the inverter 120 as the rotatable shaft 38 rotates both varying speed and torque. In the embodiment, the inverter 120 can be an inverter such as the PVI-6000-OUTD-US-W marketed by Power-One Inc. of Camarillo, Calif., takes the direct current (DC) power of the generator and outputs an alternating current (AC) single-phase power. In another embodiment, the hub 38 can act as the generator.

Figure 14:
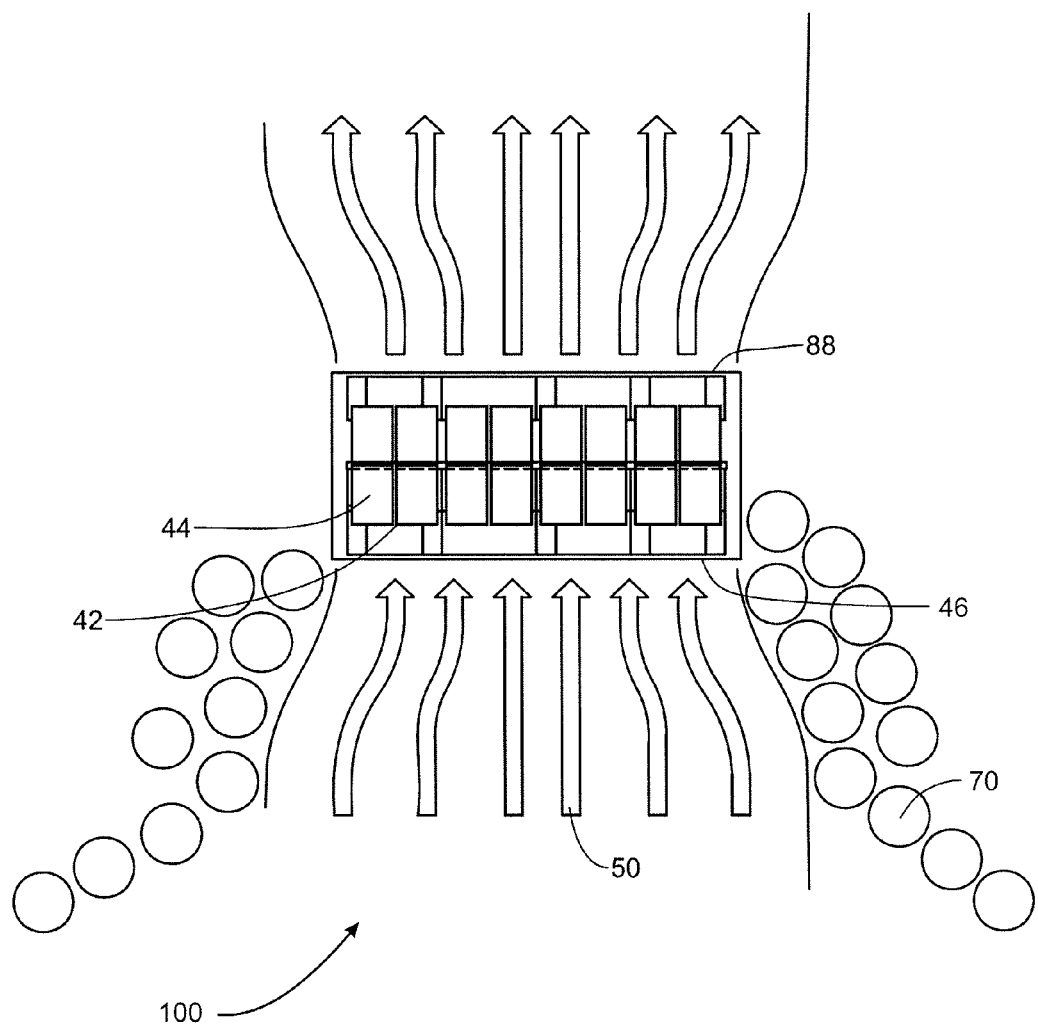
FIG. 14 is a top schematic view of the alternative system of FIG. 11.

Referring to FIG. 14, a top schematic view of the system 100 of FIG. 11 is shown. The wind guide system 24 in addition to the wind blocks 46 and 88 has other structures such as series of trees or brush 70 to direct the air toward the windmill device 22. The increase in speed of the air as it approaches the windmill device 22 results in faster rotation of the rotatable shaft 36 therein generating electricity.

It is recognized that the wind blocks 46 and 88 can come in various forms. While the wind block 46 has been described above as natural structures such as trees and brush and as manufactured structures such as canvas, plywood, or art, it is recognize that the structure can take other forms including brick walls and display screens.

It is recognized that instead of converting the energy into electricity through a generator and an inverter, the kinetic energy from the rotating shaft can be used to operate a pump that pressurizes a hydraulic accumulator. In that the rotation of the shaft may not be constant, the pumping may not be constant, but the hydraulic accumulator stores the unregulated energy. The pressure from the hydraulic accumulator then regulates this energy with a valve and uses this regulated energy to operate a hydraulic motor at a fixed RPM that drives a generator to produce AC at a regulated voltage and frequency for one's house or grid tie-in. The accumulator acts both as an energy storage and regulating device. The regulating valve would shut off, turning off the generator, whenever pressure in the accumulator drops below a set point, and the energy-creating device would then recharge the accumulator.

It is recognized alternatively that an electromechanically-controlled variable displacement hydraulic pump can be used to regulate a constant flow to a generator. The frequency of the electricity generated is regulated. The voltage is increased or decreased by increasing or decreasing the pressure (pounds per square inches (PSI)) driving the generator as wind speed increases or decreases.

Furthermore, the generator can be tied into the grid, the power system. The generator is started by the grid and therefore is in synch with the grid. The wind system 20 rotating the shaft 36 engages the generator 38 to drive the generator, which is synchronized with the grid. By increasing the moment of inertia of the system as described herein, the supply of electrical energy generated by the wind-engaging system is more even.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

The invention claimed is:

1. A system for generating energy from the movement of air, the system comprising:
  a plurality of wind devices, each wind device including:
    a mounting structure for securing to the ground;
    a horizontal rotatable shaft, rotatably carried by the mounting structure;
    at least three wind-engaging panels, and
    at least three panel-mounting frames projecting from the horizontal rotatable shaft with an innermost side nearest to the rotatable shaft and an outermost side farthest from the rotatable shaft, wherein the panel-mounting frame comprises lightweight materials except for the outermost side of the panel-mounting frame, the panel-mounting frame rotatable with the horizontal rotatable shaft, each panel-mounting frame carrying one of the wind-engaging panels wherein there is an air gap between the panel and the rotatable shaft and the panel mounting frame is weighted on the outermost side;
  a first wind guide system comprising a first wind block, the first wind guide system for assisting in directing the airflow from a first direction towards the wind-engaging panels while limiting the airflow from the first direction from engaging all the panels at the same time;

a second wind guide system comprising a second wind block, the second wind guide system for assisting in directing the airflow from a second direction opposite the first direction towards the wind-engaging panels while limiting the airflow from the second direction from engaging all the panels at the same time; and a mechanism to convert the rotational energy of the shaft into another form of energy wherein the mechanism to convert the rotational energy of the shaft is a generator and the another form of energy is electrical energy.

2. A system for generating energy from the movement of air, the system comprising:

a plurality of wind devices, each wind device including:

a mounting structure for securing to the ground;

a horizontal rotatable shaft, rotatably carried by the mounting structure;

at least three wind-engaging panels; and at least three panel-mounting frames projecting from the horizontal rotatable shaft with an innermost side nearest to the rotatable shaft and an outermost side farthest from the rotatable shaft, the panel-mounting frame rotatable with the horizontal rotatable shaft, each panel-mounting frame carrying one of the wind-engaging panels wherein there is an air gap between the panel and the rotatable shaft and the panel mounting frame further comprises one or more weights attached to the outermost side of the panel-mounting frame;

a first wind guide system comprising a first wind block, the first wind guide system for assisting in directing the airflow from a first direction towards the wind-engaging panels while limiting the airflow from the first direction from engaging all the panels at the same time;

a second wind guide system comprising a second wind block, the second wind guide system for assisting in directing the airflow from a second direction opposite the first direction towards the wind-engaging panels while limiting the airflow from the second direction from engaging all the panels at the same time; and a mechanism to convert the rotational energy of the shaft into another form of energy wherein the mechanism to convert the rotational energy of the shaft is a generator and the another form of energy is electrical energy.

\* \* \* \* \*